United States Patent [19]

Lutz

[11] 3,999,671
[45] Dec. 28, 1976

[54] ARTICLE HANDLING SYSTEM
[76] Inventor: David Edward Lutz, 300 Washington St., Carlisle, Pa. 17013
[22] Filed: Feb. 24, 1975
[21] Appl. No.: 552,110
[52] U.S. Cl. .............................. 214/516; 198/472; 198/606; 214/519
[51] Int. Cl.² .......................................... B60P 1/52
[58] Field of Search ............... 214/83.3, 83.14, 84, 214/515, 516, 518, 519, 16.1 CD; 198/85, 221

[56] References Cited
UNITED STATES PATENTS

| | | | |
|---|---|---|---|
| 2,630,909 | 3/1953 | Mariotte | 198/221 |
| 2,891,659 | 6/1959 | Westeren | 198/221 |
| 2,999,579 | 9/1961 | Kostrzewa | 198/221 X |
| 3,243,062 | 3/1966 | Frassetto | 214/84 |
| 3,439,790 | 4/1969 | Langley et al. | 214/84 |
| 3,777,916 | 12/1973 | Lutz | 214/519 |
| 3,809,208 | 5/1974 | Shields | 198/85 |

Primary Examiner—Robert G. Sheridan
Attorney, Agent, or Firm—Edward E. Dyson; John J. Byrne

[57] ABSTRACT

An article handling system for trucks or tractor-drawn trailers which will deliver an article, such as a palletized load, to the rear opening of the truck from a designated position thereon without having to remove other containers from the truck.

8 Claims, 15 Drawing Figures

→ PULL
RELEASE ←

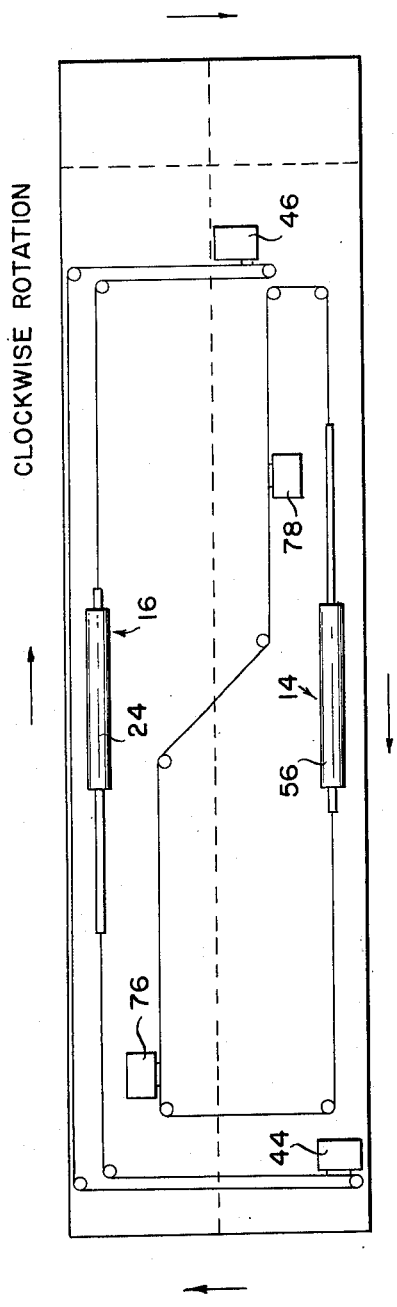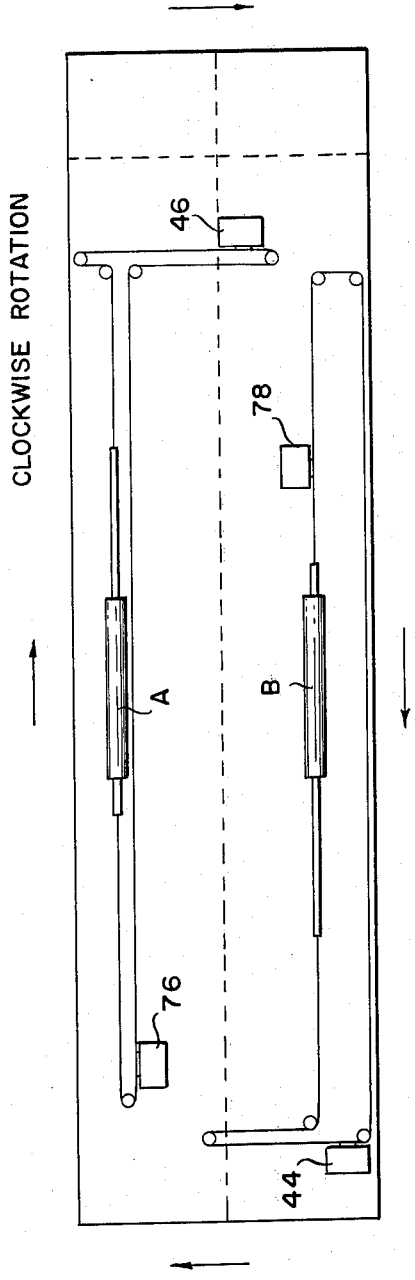

ARTICLE HANDLING SYSTEM

FIELD OF THE INVENTION

This invention relates to an article handling system, and more particularly to a system for shifting and orienting containers within the confines of a truck or tractor-drawn trailer body.

This invention is concerned with truck-mounted mechanized article handling systems which may be easily fitted to existing truck bodies, including tractor-drawn trailer bodies. The mechanized system is particularly adapted for use with standarized containers although it is to be understood that the invention is not limited specifically thereto. The system of this invention is designed to facilitate the general loading and unloading of the containers, but more importantly a primary purpose of the system is to permit access to a particular container regardless of its position on the truck relative to the rear opening without having to remove other containers from the truck.

BACKGROUND OF THE INVENTION

A number of systems are known in the prior art for facilitating the general loading and unloading of the contents of a truck. Generally, these systems take the form of roller conveyors, pushing and pulling power elements or the like, and do not permit access to a container at the forward end of the truck without removing other containers. It is known to use an endless power conveyor on a truck body which is designed to deliver a particular container to the rear of the truck. However, such systems are impractical from a cost standpoint in that entirely too much free space must be allowed for the containers on the conveyor to make the turns around the sharp corners of the truck body. Further, the mechanism of the conveyor itself has generally been of a rather bulky construction further reducing the space that is available for the hauling of cargo. The system of this invention permits the carrier to maximize the usage of the space within the truck body.

This invention is an improvement over the article handling systems disclosed in applicant's U.S. Pat. No. 3,802,588, dated Apr. 9, 1974, entitled ARTICLE HANDLING SYSTEM and U.S. Pat. No. 3,777,916, dated Dec. 11, 1973, also entitled ARTICLE HANDLING SYSTEM, both of which issued to the applicant herein.

The basic concept under which the system disclosed in those patents operates involves the sectioning of the truck body into a plurality of contiguous, generally square areas aligned in two longitudinal rows. Each of the squares receives a container with the exception of one which is left blank. By subjecting the two rows of containers to a plurality of sequenced rectilinear movements using the blank space, a particular container may be brought to a particular location on the floor of the truck body without having to remove any of the containers from the truck, thereby saving many man hours in unloading the truck. Wear and tear on the truck body is minimized in that, since a container is delivered to the rear opening mechanically, a fork lift need not enter the truck for the removal of a container located at the front.

This invention is designed on the basic concept disclosed in those earlier patents but constitutes an improvement over the apparatus disclosed in those patents for moving the loads in a rectangular endless path.

In addition to providing an improvement in apparatus utilizing a single blank space in one of the pair of rows, the concept of using at least two blank spaces, one in each row, is introduced herein. This enables the longitudinal drive means and then the transverse drive means to be actuated simultaneously, i.e., a pair of rows can be shifted simultaneously. The result is that a load can be moved through the complete rectangular path in half the time of that required by using a single blank space.

Accordingly, it is an objective of this invention to provide a mechanized article handling system for truck or tractor-drawn trailer bodies which is fast and efficient in operation.

It is a further objective of this invention to provide a new and useful method for handling loads on a truck or tractor-drawn trailer the practice of which method results in substantial savings in manpower and time.

It is another objective of this invention to provide a mechanized article handling system primarily useful for trucks or the like, employing a plurality of cable-drive arrangements which move the loads in a rectangular path within the confines of the vehicle body.

It is still another objective of this invention to provide a system which makes efficient use of a minimum number of power sources for effecting movement of the loads through a rectangular path using either a single or a double blank space.

It is a further objective of this invention to provide a mechanized article handling system for trucks or the like wherein the mechanized system consumes virtually none of the interior volume of the truck body and shifts the container in rectilinear paths in such a manner that the maximum volume of the truck body may be utilized for the handling of income-producing freight.

Another objective of this invention is to provide an article handling system which may be readily installed in any conventional truck or trailer without structurally modifying the vehicle.

SUMMARY OF THE INVENTION

As stated above, the apparatus of this invention constitutes an improvement over those mechanism disclosed in applicant's prior patents in that it is, for the most part, simplier in construction, has fewer parts, and is more readily installed in truck bodies. Further, the apparatus of this invention is more versatile in that by redirecting and rearranging drive cables on the floor of the vehicle, the system can be changed to operate either with a double-blank space or a single-blank space and the direction of movement can be changed.

The basic apparatus of this invention comprises a plurality of load-receiving trays which are movably supported on casters which in turn are secured to the vehicle floor. The trays are arranged in a pair of longitudinal rows on the vehicle and cover substantially the entire area of the vehicle floor with the exception of either a single blank space the size of one of the trays or a double-blank space, one for each row depending upon the movement to which the system is geared as will be explained more fully below. In any event, a particular tray can be moved through a longitudinal row to an end of the vehicle whereupon it is shifted transversely to the other longitudinal row to be moved through that row to the other end of the vehicle whereupon it can be either removed or shifted transversely back to the other row to repeat the cycle. Cable driven detents or trolleys are mounted on trackways in the vehicle floor and engage the trays to move them longitudinally and transversely of the vehicle. The trolleys or detents are reciprocated in their trackways by means of cables which in turn are driven in a preferred embodiment, by hydraulically actuated, double-acting cylinders. In one of the preferred embodiments, a single double-acting cylinder effects both transverse movements at either end of the vehicle and a single double-acting cylinder effects the longitudinal movements through each longitudinal row. In other words, only two power sources are needed to effect movement of the loads through the rectangular path. A number of variations of this basic arrangement are disclosed utilizing the single blank space concept and the faster, double blank space concept.

BRIEF DESCRIPTION OF THE DRAWINGS

FIG. 7 is a schematic illustration of an article handling system similar to that of FIG. 1 except that the cables are so arranged that the load is moved in a clockwise direction utilizing the single blank space;

FIG. 8 is a further alternative embodiment of the article handling system of this invention showing the cables arranged in a different manner for effecting clockwise rotation of the loads utilizing a single blank space;

Figure 1:
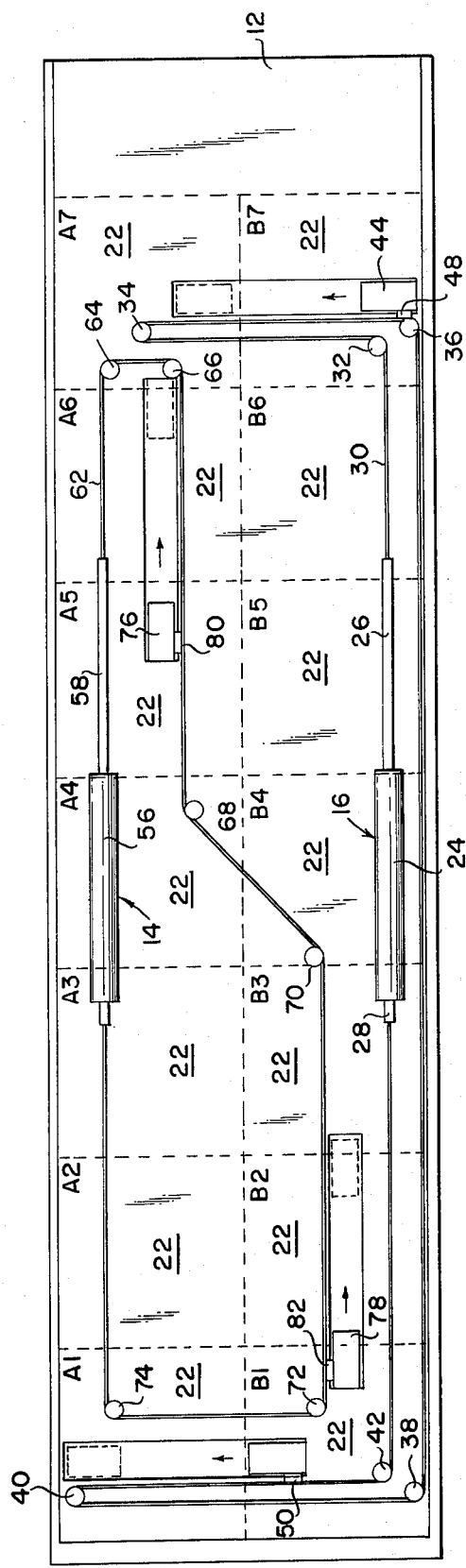
FIG. 1 is a generally schematic plan view of a preferred embodiment of the article handling system of this invention whereby loads may be moved in a rectangular path in a counterclockwise direction.

The concept upon which this invention is based can best be understood with reference to FIG. 1 wherein there is shown an enclosed truck body, in this case, a tractor-drawn trailer. The trailer includes a floor 12 on which are positioned a longitudinal drive unit 14 and a transverse drive unit 16 each of which will be described in greater detail hereinafter. As can be best seen in FIG. 1, the trailer is sectioned into squares aligned in two longitudinal rows, A and B. The squares in the two rows are numbered A1 through A7 and B1 through B7, respectively.

Each of the squares is occupied by a roller supported tray 22 with the exception of one square which in FIG. 1 is square A7. Accordingly, the transverse drive means 16 is first actuated to shift the tray in B7 to A7. Longitudinal drive means 14 is then actuated to move the tray in spaces B1 through B6 to spaces B2 through B7, following which the transverse drive means 16 is again actuated to move the tray in A1 to B1. The longitudinal drive means 14 is again actuated to move the trays in A2 through A7 to A1 through A6, whereupon space A7 is again vacant and one cycle is completed. A cycle comprises four successive movements where a single blank space is used.

Other embodiments are disclosed wherein each of the squares is occupied by a roller supported tray 22 with the exception of two squares, for example, squares B1 and A7, which are left vacant. These vacant areas permit the trays to be shifted in simultaneous transverse or simultaneous longitudinal movements as will hereinafter be more fully described. This effectively halves the time required to move a load through a complete rectangular path.

One complete circuit is defined as repeating the cycle until the original arrangement is regained. Thus, it can be seen that by performing a certain number of operational sequences a particular container, for example, one occupying the position in station A1 at the front end of the trailer can be delivered to the position B7 at the rear end of the trailer where it can be conveniently removed by a fork lift truck or the like without having to remove any of the other containers from the trailer. It is also to be observed that this system permits the utilization of a maximum amount of space within the truck body. This is contrary to endless conveyor systems of the prior art wherein a large amount of wasted space had to be allowed at each end of the trailer to permit the containers to make the turns.

The transverse drive means generally indicated by the numeral 16 in FIG. 1 includes a fluid actuated cylinder 24 which is double-acting and which includes a piston rod 26 on one end and a piston rod 28 on the other. The stroke length of the piston is generally equal to the width of a tray 22 which is the distance required to move the tray from one space to another. A cable 30 is attached at one end to the end of piston rod 26 and extends around guide pulley 32 which is mounted on the floor of the vehicle for rotation about a vertical axis and then around pulleys 34, 36, 38, 40 and 42 whereupon the other end of the cable is connected to the end of piston rod 28. Drive detents 44 and 46 to be described in greater detail below are connected to the cable at 48 and 50 respectively on what are referred to as the transverse runs of the cable 30. It can be seen that when the cylinder 24 is actuated so that the piston rod 26 is retracted and the rod 28 is extended, the cable 30 is pulled to the left by the piston rod 26 causing the drive detents 44 and 46 to move their respective dotted line positions as shown in FIG. 1. When the cylinder is again actuated to extend the piston 26 and retract the piston rod 28, the drive detents are moved back to their full line positions as shown in FIG. 1.

The longitudinal drive means 14 includes a fluid-actuated cylinder 56 having piston rods 58 and 60. A cable 62 extends from piston rod 58 around guide pulleys 64, 66, 68, 70, 72, and 74 and is attached at its other end to the end of piston rod 60. Drive detents 76 and 78 are attached to the cable at 80 and 82 respectively along what will be referred to as the longitudinal runs of the cable 62. When the cylinder 56 is actuated to retract the piston rod 58 and extend the rod 60, the cable 62 will be pulled to the left as viewed in FIG. 1 whereupon drive detent 76 will be pulled to the right to the dotted line position. Likewise drive detent 78 will be pulled to the right to its dotted line position. It is to be understood that the drive detents engage trays which occupy the spaces diagrammatically illustrated in FIG. 1, with the exception of one space which is left blank.

Figure 2:
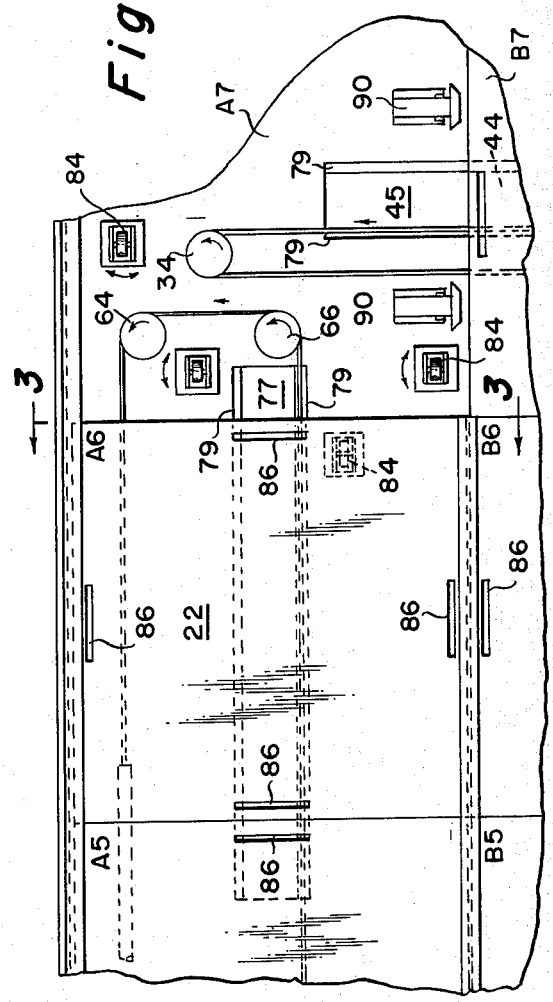
FIG. 2 is a fragmentary view of the system of FIG. 1, more clearly illustrating the changeover between the transverse drive means and the longitudinal drive means.
Figure 12:
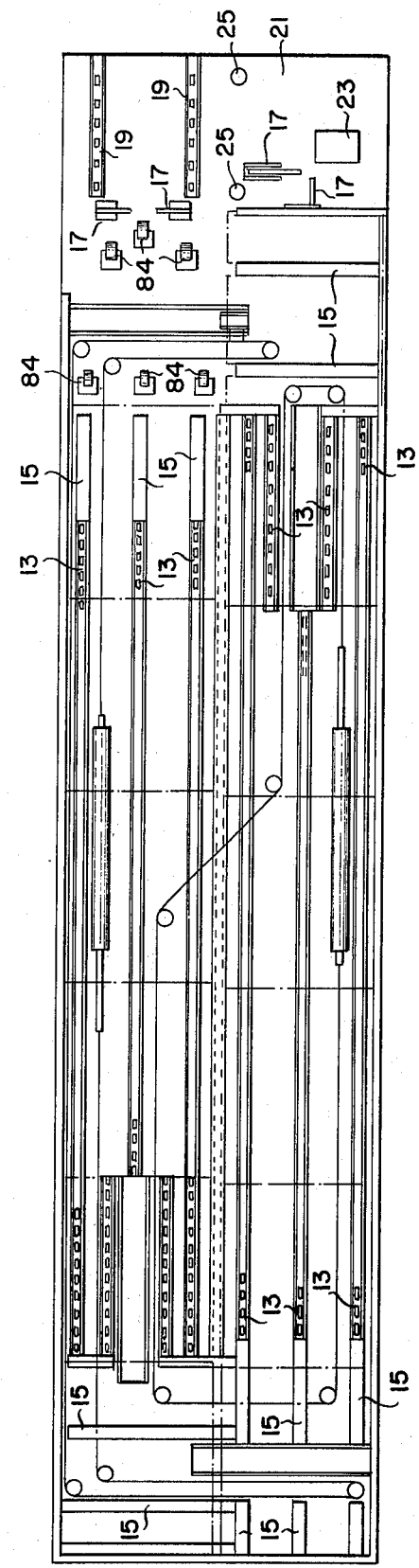
FIG. 12 is a plan view of the arrangement of FIG. 1 emphasizing the load supporting rollers and braking strips affixed to the vehicle floor.

As shown in FIG. 2, a plurality of casters, all indicated by the same number 84, are mounted on the floor 12 of the vehicle 10 for swivel motion as is conventional with casters. FIG. 12 is illustrative of a floor arrangement suitable for supporting trays 22 for movement over the floor. This arrangement is suitable for the embodiment of FIG. 1 and the embodiments to be disclosed later herein with only slight modifications necessary to accommodate the different positions of the conveyor hardware.

In FIG. 12 it can be seen that strings of rollers 13 underlie the longitudinal rows of conveyors with preferably three strings of rollers for each row. Of course, sufficient space is left for the trackways which receive the drive detents. Braking members or static rests 15 are spaced strategically on the floor of the vehicle, preferably at the ends thereof. These rests comprise a supporting base and are covered on the top with a friction-reducing material such as nylon or the like. The top surfaces of the members are substantially level with the surface of the rollers of the roller strings 13 and the casters 84. The purpose of these braking members is to provide a more stable support when the loads are in transit. The loads which are supported entirely on the rollers or casters would not be very stable. The front end of the vehicle in the area of transverse movement is provided solely with the braking member type of supports while on the rear end of the vehicle a combination of braking support members 15 and the casters 84 is used. To further assist in stabilizing the load, toggle throw type of load-bracing devices 17 are provided at the rear ends of the longitudinal rows. When unloading, rollerways 19 are provided at the rear of one row of loads to facilitate removal of loads from the vehicle and onto a loading dock, or at least onto a position where it can be reached by a forklift truck. The area 21 is the operator's area and includes a control panel 23 and operator protecting stanchions 25.

The trays 22 are substantially planar metal sheets of sufficient strength to support palletized loads and are provided with slots 86 along each side edge portion thereof. These slots receive the drive detents as will be explained more fully below. FIG. 2 further shows in greater detail the cable arrangement at the changeover section between the transverse drive means and the longitudinal drive means. FIG. 2 also more clearly shows the trackway 45 which receives the drive detent 44 and the trackway 77 which receives the longitudinal drive detent 76. It is to be understood that all of the drive detents and trackways are substantially identical. FIG. 2 also shows detent devices 90 which hold trays in the space A7. The detents permit movement of the trays into space A7 from space B7 but prevent the trays from moving back into space B7, though it does not prevent the trays from moving from A7 to A6. In other words, the detents are arranged for counterclockwise movement of the trays through the rectangular path defined by the two rows of trays.

Figure 3:
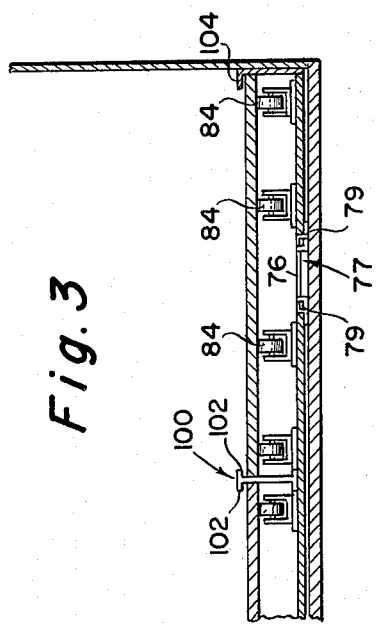
FIG. 3 is a view taken on line 3—3 of FIG. 2.

FIG. 3 further illustrates guide rail 100 which extends down the center of the vehicle and which is provided with outwardly extending flanges 102 which keep the trays from rising up. Likewise a similar flange 104 is mounted along each side wall of the vehicle. Again, the purpose is to again keep the trays in position on the rollers or casters to prevent them from rising upwardly.

Figure 4:
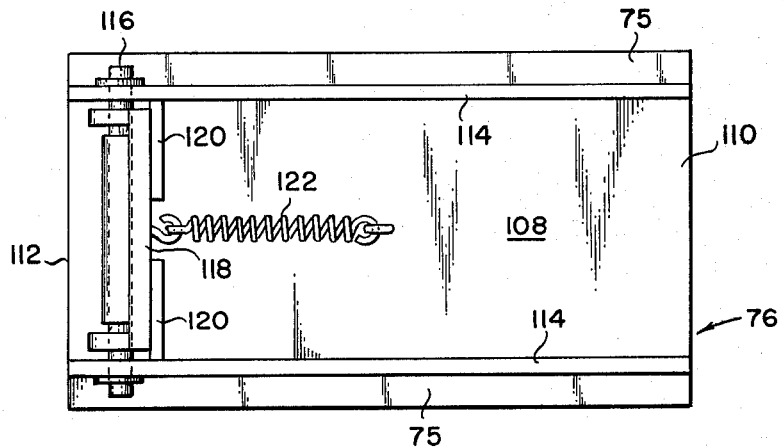
FIG. 4 is a plan view of the drive detent which engages and moves the load-supporting trays.
Figure 5:
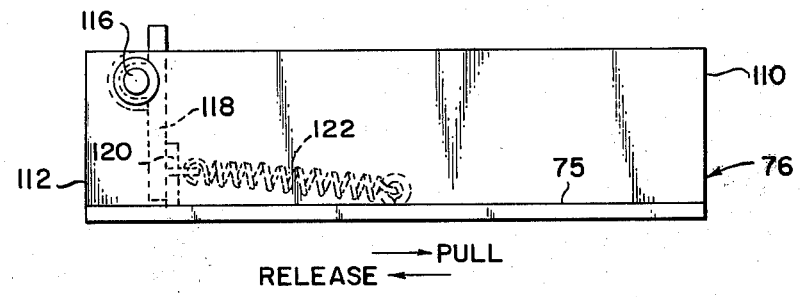
FIG. 5 is a side view in elevation of the detent of FIG. 4.
Figure 6:
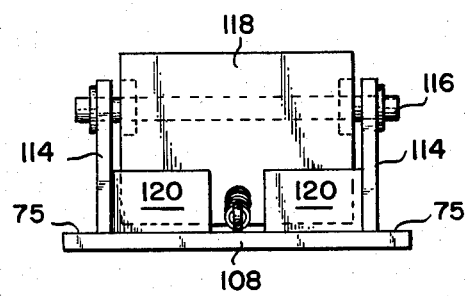
FIG. 6 is a front view in elevation of the drive detent of FIG. 4.

One of the drive detents is shown in greater detail in FIGS. 4 through 6. Detent 76 will be described, however, it is to be understood that the other drive detents 44, 46 and 78 are identical. The detent includes a floor portion 108 which terminates in underlying flanges 75 which are received in the channels defined by the overlying flanges 79 on the trackway 77. The drive detent will be referred to as having a front end 110 and a rear end 112. The side walls 114 extend the length of the detent and at the rear end portion thereof an axle 116 extends between the two walls. The axle swingably supports the detent element 118, the upper portion of which is the part that is actually received in the slots 86 in the trays when the drive detent is in driving position. A pair of stops 120 are mounted on the floor of the detent and prevent the detent element 118 from swinging in the counterclockwise direction from the position shown in FIGS. 4 and 5. A tension spring 122 is connected at one end to the floor 108 and at the other end to the lower end of the drive detent 118 to maintain it in the position shown in FIGS. 4 and 5, up against the stops 120. It can be seen that when the element 118 is engaged in one of the slots 86 of the tray and the drive detent is moved to the right as viewed in the figures, the element 118, because of its inability to swing in a counterclockwise direction about the axis 116, will pull the tray to the right. However, when the drive detent is moved to the left, the element 118 can pivot in the clockwise direction against the bias of the spring 122 whereupon the element 118 is released from the slot 86 of one of the trays and permits the detent to move under and into driving engagement with an adjacent tray.

Referring again to FIG. 1, it is to be understood that the embodiment shown therein utilizes a single blank space to move the loads in a rectangular path through the two rows A1 to A7 and B1 to B7. In operation, assuming that space A7 is vacant, transverse drive means 16 is actuated to retract cylinder 56 whereupon the detent 44 which is in driving engagement with the tray occupying the space B7 is moved to the dotted line position to move the tray in B7 to A7. At the same time, the detent 46 which had been in engagement with the tray occupying space B1 is released and moved back to the dotted line position and into engagement with one of the drive slots of the tray occupying space A1. In the second step of the cycle, longitudinal drive means are actuated whereupon piston rod 58 is retracted and cable 62 is pulled to the left thereby pulling detent 78 which is in driving engagement with the tray occupying space B1 to the dotted line position. The trays occupying spaces B2 through B6 are pushed by the tray occupying space B1 one tray length such that the trays will occupy positions B2 through B7. At the same time, drive detent 80 will be released from the tray in space A6 and will be moved back to the position underlying and in driving engagement with the tray occupying space A7. The transverse drive means 24 is actuated to move the tray in A1 to the now vacated space in B1, following which the longitudinal drive means is again actuated to move the trays occupying spaces A2 through A7 to the spaces A1 through A6. Space A7 is now vacant and one cycle has been completed. The successive actuations of the transverse and longitudinal drive means is continued until a selected load appears at the rear of the vehicle whereupon it can be readily unloaded.

Figure 13:
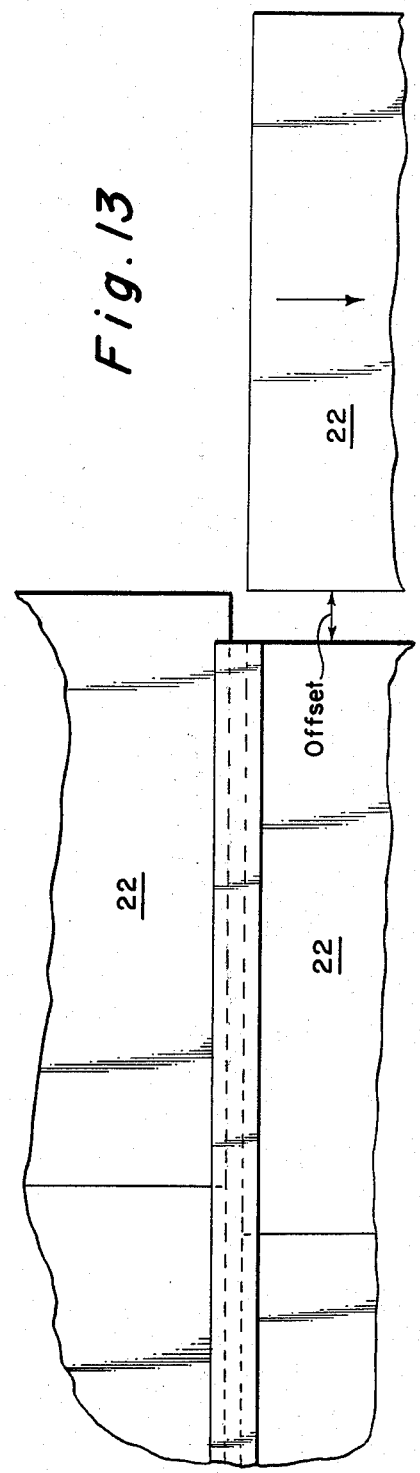
FIG. 13 is a partial fragmentary diagrammatical view of the right lower corner section of each of the embodiments shown heretofore, emphasizing the offset between the longitudinal rows to prevent snagging during transverse movements.

The longitudinal rows are preferably offset, as shown in FIGS. 12 and 13 such that a load being shifted transversely from one row to the next will not snag a load in the next row. This offset is accomplished by only slightly lengthening the stroke of the longitudinal drive pistons. The stroke length will be equal to a load length plus the offset. When a load is engaged, for longitudinal movement it will first cover the distance of the offset space an will then cover one load length to move the entire row one load length.

Figure 9:
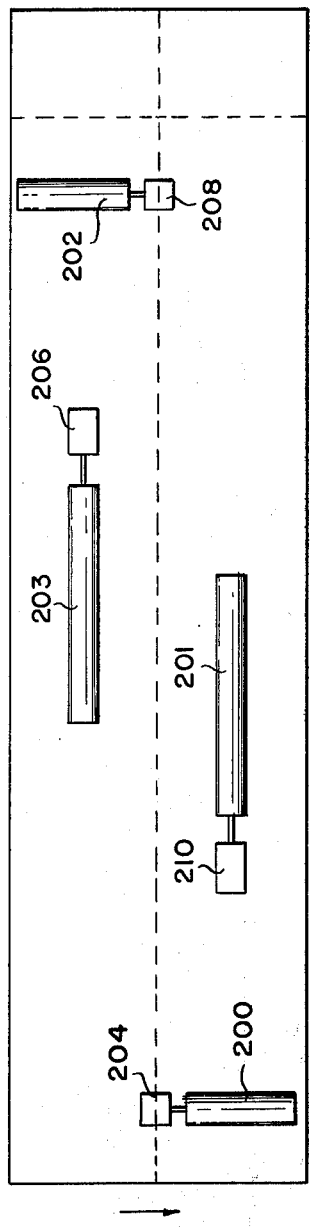
FIG. 9 is a schematic illustration of an arrangement of fluid actuated cylinders wherein the tray engaging drive detents are connected directly to the piston rods of the cylinders and wherein loads may be moved in the counterclockwise direction utilizing either a single blank space or a double blank space.
Figure 10:
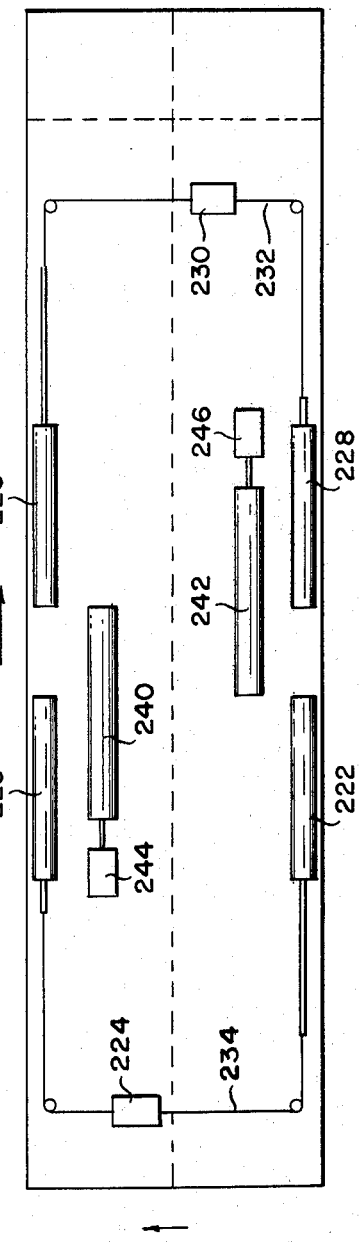
FIG. 10 is a schematic illustration of an arrangement of the article handling system of this invention which effects clockwise rotation utilizing either a single blank space or a double blank space.

FIGS. 7 through 11 schematically illustrate different arrangements of the cable-driven detents utilizing either the single blank space or double blank space concepts, and in the instance of the arrangements shown in FIGS. 9 and 10, utilizing additional fluid power cylinders and in some instances utilizing drive detents which are directly connected to the piston rods of some of the fluid power cylinders.

FIG. 7 is the mirror image of the arrangement shown in FIG. 1 and the only difference in the arrangement shown in FIG. 1 and that of FIG. 7 is that in FIG. 1 the loads are moved in a counterclockwise direction while in FIG. 7, the loads are moved in a clockwise direction.

In the arrangement shown in FIG. 8, the fluid power cylinder A drives the longitudinal detent 76 and the transverse detent 46 while the cylinder B drives the longitudinal detent 78 and the transverse detent 44. In the case of rectangular trays wherein the length is greater than the width, a lost motion connection has to be provided between the cables and the transverse detents 44 and 46 since the stroke length for the cylinders A and B will be the same for a transverse or a longitudinal movement. The arrangement shown in FIG. 8 utilizes a single blank space as with the arrangements of FIGS. 1 and 7 and move the loads in the clockwise direction. Of course, it is to be understood that for all arrangements shown, the direction of movement is dependent upon the positioning of the drive detents and the arrangement of the cables over the floor of the vehicle.

In FIG. 9 a still further simplified system is shown wherein four power cylinders 200, 201, 202 and 203 are placed on the vehicle floor, with cylinders 201 and 203 effecting longitudinal movement of the trays while cylinders 200 and 202 effect the transverse movements. The detents 204, 206, 208, and 210 are identical to that described with the earlier described embodiments; however, they are connected directly to the piston rods of the cylinders 200 – 203. As shown, the cylinders are designed for counterclockwise movement of the load through the rectangular path. However, it is to be understood, as with all the other embodiments, the direction of the cylinders may be merely reversed whereupon clockwise rotation can be effected. In any event, assuming that the space in the upper righthand corner is vacant, cylinder 202 is extended and then retracted to draw the load in the adjacent space transversely and into the vacant upper righthand corner space whereupon cylinder 201 is actuated to move its row of trays to the right and into the newly vacated space. Transverse drive cylinder 200 is then activated, following which the longitudinal cylinder 203 is activated. After this sequence of movements, the space in the upper righthand corner is again vacant. This describes the operation wherein a single blank space was utilized. Assuming that double blank spaces are utilized and the system shown in FIG. 9 is operable with double blank spaces, then the time consumed in moving a load throughout the entire rectangular path is cut in half. For example, assuming that the space in the upper righthand corner and the space in the lower left hand corner are vacant, then, transverse cylinders 200 and 202 may be operated simultaneously to move loads from adjacent rows into those vacant spaces, following which hydraulic cylinders 201 and 203 are simultaneously actuated to move the two rows longitudinally in opposite directions.

In FIG. 10 an arrangement is shown for moving loads in the clockwise direction utilizing either a single blank space or double blank spaces. Again, it is to be understood that by utilizing the mirror image arrangement of the arrangement shown in FIG. 10, the direction of movement of the load can be reversed. In any event, a pair of cylinders 220 and 222 are utilized to effect movement of one transverse detent 224 through connecting cable 234 while cylinders 226 and 228 effect movement of the other transverse detent 230 through connecting cable 232. By using pairs of cylinders in this manner, the detents 224 and 230 may be operated simultaneously to move loads from adjacent rows to adjacent blank spaces where the double blank space concept is used. The longitudinal movements are effected by cylinders 240 and 242 which have directly connected thereto longitudinal drive detents 244 and 246. By simultaneous actuation of the cylinders 240 and 242, the trays or loads in the two rows may be moved simultaneously in opposite directions. Of course, by energizing the drive means one at a time, the arrangement of FIG. 10 can be used to move loads through the rectangular path utilizing only a single blank space.

Figure 11:
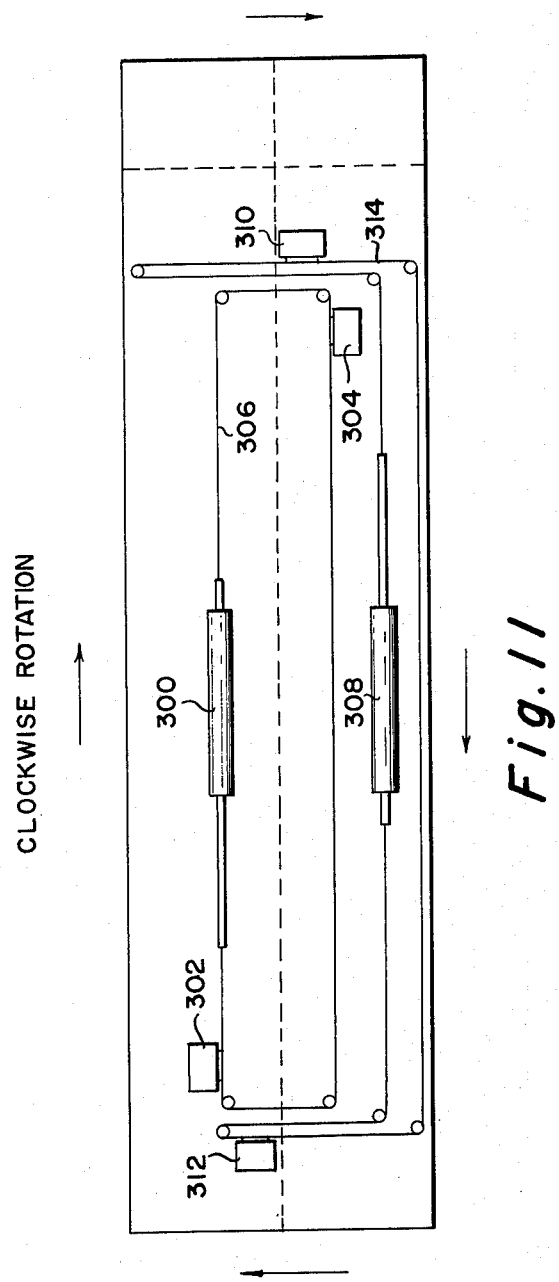
FIG. 11 is a schematic illustration of another embodiment of the article handling system of this invention wherein the cables are arranged to effect clockwise movement of the loads utilizing a double blank space.

Finally, in FIG. 11 an arrangement is disclosed which is used to move a load through a path in the clockwise direction utilizing double blank spaces. Cylinder 300 when actuated, causes longitudinal driving movement of longitudinal drive detents 302 and 304 through cable 306. Transverse drive cylinder 308 simultaneously effects transverse driving movement of transverse detents 310 and 312 by means of cable 314.

It can be seen that the cable, drive detent arrangement disclosed by applicant is highly versatile and may be readily adapted to existing vehicles without significant structural modification. Further, by varying the disposition of the cables, detents and power cylinders on the floor of the vehicle, the direction of movement of the loads can be varied. Further, by making other modifications previously described, a double blank space concept may be utilized whereby loads are moved through the rectangular path in half the time required when only a single blank space is employed. Finally, a savings in power is realized in a number of the embodiments disclosed herein, particularly those described in FIGS. 1, 8 and 11, wherein only a pair of hydraulic cylinders are required to effect the two transverse movements and the two longitudinal movements.

Figure 14:
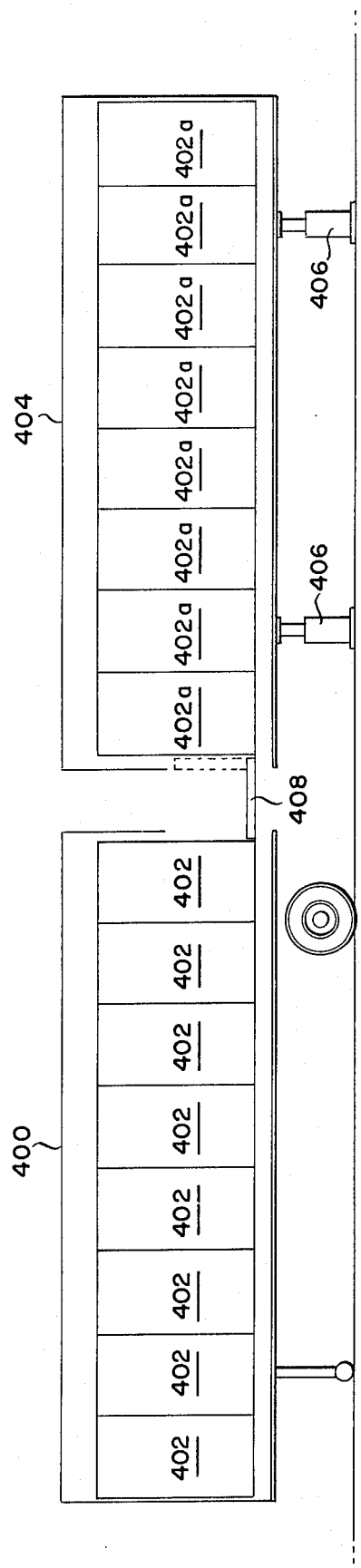
FIG. 14 is a diagrammatical side view in elevation of a modified form of this invention.
Figure 15:
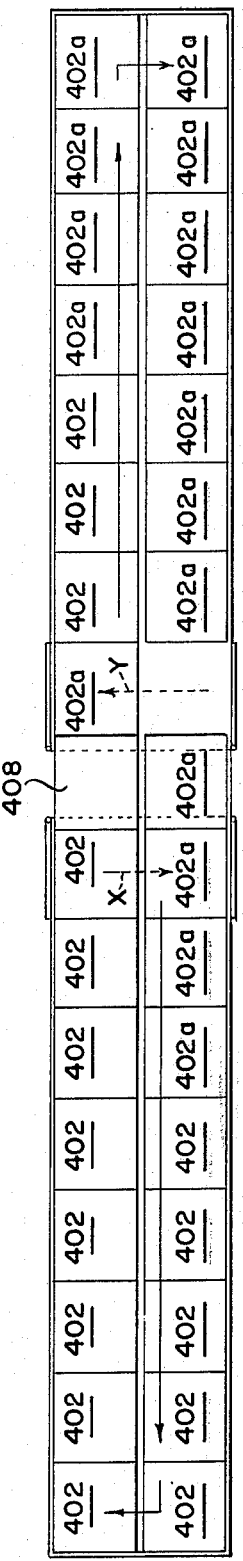
FIG. 15 is a plan view of the embodiment of FIG. 14.

FIGS. 14 and 15 diagrammatically illustrate a system whereby a vehicle load may be exchanged with a load in another vehicle or in a stationary housing or unit on a loading dock. The system employs the indexing arrangement described with respect to the aforegoing embodiments wherein loads are indexed in a rectangular path using at least a single void area on the floor of the vehicle. In the Figures, the number 400 indicates a trailer loaded with a plurality of unitized containers or palletized loads 402. The loads are aligned in two longitudinal rows on conveyors which are designed to index the loads in a rectangular path through the two rows. The embodiments described earlier herein can be used in this system or the embodiments disclosed in applicant's earlier patents may be used. A stationary unit 404 can be mounted on a loading dock or is mounted on hydraulically adjustable supports 406 by which the stationary unit 404 can be adjusted to the height of the vehicle or trailer 400. The loads in the stationary unit 404 are identified by the numeral 402a. The stationary unit 404 is likewise provided with a conveyor mechanism which will index the loads through an endless rectangular path within the confines of the unit. Further, the trailer and the stationary unit 404 are provided with closures which may be locked for security purposes. It is to be understood that the stationary unit 404 may be replaced by another trailer or the like.

The purpose of this arrangement is to exchange the load of the trailer 400 with the load of the unit 404. This is accomplished by deactivating the transverse conveying units at the adjacent ends of the units 400 and 404. For example, in the embodiment of FIG. 1 of this application, the drive detent may be held by any suitable mechanical means in the downward, out-of-engagement position such that even though it is actuated and goes through the motions, it will not engage the trays. A spanning or connecting conveyor such as a roller conveyor or the like 408 is positioned between the floors of the trailer 400 and the stationary unit 404. In FIG. 14, the connecting conveyor 408 is exaggerated, however, it is to be understood that it is of a height which is substantially equal to the height of the supporting rollers or casters which support the loads 402 or 402a. Since the transverse movements at the adjacent ends of the units (which movements are indicated by the dotted-line arrows X and Y) have been eliminated, upon actuation of the system, the units will travel in an enlarged rectangular path which covers the two units. Accordingly, the loads are indexed within the longitudinal rows and within the units until they are completely exchanged. In FIG. 15, the exchange process is indicated as being in process.

In practical application, a supermarket or the like may employ one of the stationary units on one of its loading docks and perhaps may fill it with empties to be returned. A supply truck may arrive at any time during the night or day. The driver can unlock the unit 404 and by actuating the conveyors in each, can fully exchange the loads, can lock up the unit 404, and then drive off. There is no need for an attendant to be present and when the store manager arrives in the morning he will find a complete new stock. It is contemplated that the power units for the conveyor systems for each of the units can be connected in tandem such that one will be a slave to the other.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. In combination with a vehicle having a load supporting floor, an article handling system comprising a plurality of loads of generally rectangular configuration in horizontal cross-section arranged in two closely adjacent longitudinal rows and substantially covering the entire floor area of said vehicle with the exception of at least one void area approximately the size of the area covered by one load, means supporting said loads for movement on said floor, first drive means for shifting the loads in said rows in longitudinal directions, second drive means for shifting said loads in directions transverse to said longitudinal directions, said longitudinal and transverse movements being possible through utilization of said void area, said longitudinal drive means comprising a first reversible power source, a first flexible elongated element attached to said first power source means for movement in reversible directions, a first pair of load engaging drive detents attached to said flexible elongated element, one for each longitudinal row, underlying said loads and drivingly engaged therewith for moving said loads through said longitudinal rows upon actuation of said power means, said second drive means comprising a second reversible power source, a second flexible elongated element attached to said second power source for movement in reversible directions, a second pair of load engaging drive detents attached to said second flexible elongated element, one at each end of said rows and each movable transversely of said rows, whereby upon actuation of said second power source a load can be moved from one longitudinal row to the other longitudinal row, and means for selectively actuating said first and second drive means to intermittently move said loads through a rectangular path on said floor.

2. The combination of claim 1 wherein said first and second power sources comprise double-acting fluid actuated piston-cylinder assemblies.

3. The combination of claim 1 and including trackways, and wherein said pairs of drive detents are slidably received in said trackways.

4. The combination of claim 1 wherein said means for supporting said loads for movement on said floor comprise inverted casters attached to said floor.

5. The combination of claim 4 and including trays supported on said casters, said trays receiving and supporting said loads.

6. The combination of claim 4 wherein said trays are provided with means for operable engagement with said drive detents.

7. The combination of claim 6 and including guide rails mounted on said vehicle for restraining said trays against vertical movement off of said casters.

8. In combination with a vehicle having a load supporting floor, an article handling system comprising a plurality of loads of generally rectangular configuration in horizontal cross-section arranged in two closely adjacent longitudinal rows and substantially covering the entire floor area of said vehicle with the exception of at least one void area approximately the size of the area covered by one load, means supporting said loads for movement on said floor, first drive means for shifting the loads in one longitudinal direction in one of said rows and one transverse direction between rows, second drive means for shifting said loads in the opposite longitudinal direction in the other of said rows and the opposite transverse direction between rows, said longitudinal and transverse movement being possible through utilization of said void area, said first drive means comprising a first reversible power source, a first flexible elongated element attached to said first power source for movement in reversible directions, a first pair of load engaging drive detents attached to said first flexible element, one of said first pair underlying said loads in said one longitudinal row for moving said loads therein in said one longitudinal direction, the other of said first pair mounted at one end of said rows for moving said loads in said one transverse direction, said second drive means comprising a second reversible, power source, a second flexible elongated element attached to said second power for movement in reversible directions, a second pair of load engaging drive detents attached to said second flexible element, one of said second pair underlying said loads in said other row for moving said loads therein in said opposite longitudinal direction, the other of said second pair mounted at the other end of said rows for moving said loads in said opposite transverse direction, and means for selectively actuating said first and second drive means to intermittently move said loads through a rectangular path on said floor.

* * * * *